2,805,773

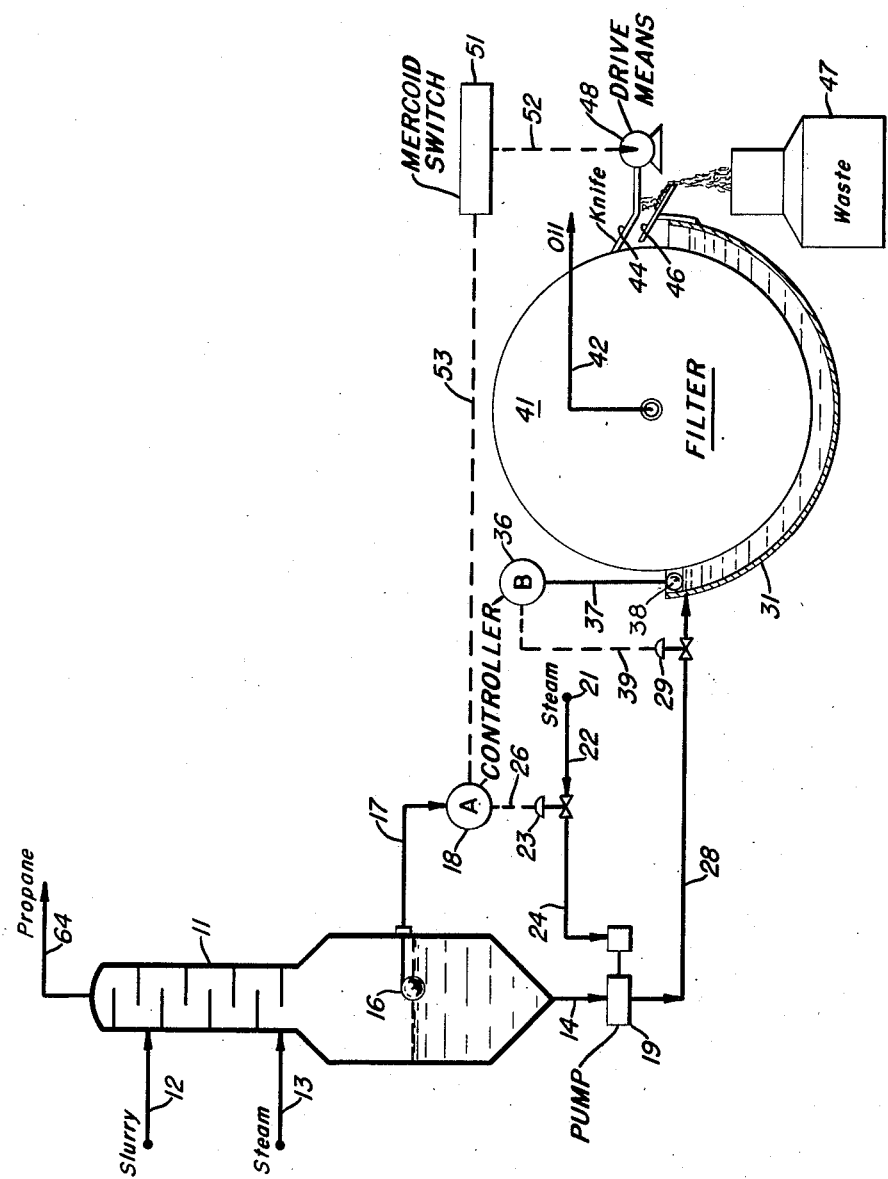

CONTINUOUS ROTARY FILTRATION

Robert W. Mecklin, Hammond, Ind., and Wallace E. Voreck, Jr., Chicago, Ill., assignors to Standard Oil Company, Chicago, Ill., a corporation of Indiana Application December 14, 1954, Serial No. 475,201

3 Claims. (Cl. 210—104)

This invention relates to filtration of slurries by means of a continuous rotary filter provided with a precoat. Particularly the invention relates to filtration wherein the amount of slurry available and/or the amount of solids varies in an unpredictable manner.

In the refining of petroleum oils for the preparation of lubricating oil stocks, the oil is at some time or other treated with adsorbent clay, which clay must be removed by filtration. In the dewaxing of petroleum distillates wherein the wax is removed by filtration, frequent and unpredictable upsets occur that affect the volume of dewaxed oil available for subsequent operation. Normally the dewaxed oil is admixed with adsorbent clay and the oil-clay slurry passed through a continuous rotary drum filter provided with a precoat to remove the clay. In a continuous operation, fluctuation in the amount of dewaxed oil and also in the quality of the dewaxed oil, for example, color, the amount of slurry and the amount of clay in the slurry varies to such an extent that it is normally impossible to operate the filter in a most economical manner. Similar situations occur in operations utilizing solid adsorbents, such as in sugar refining using activated charcoal and also in ore treatment wherein the ore slime must be filtered.

Normally the drive means which forces the knife or scraper against the surface of the filter drum to remove the cake and precoat is set to push the knife forward at a predetermined constant rate. This rate of movement is normally maintained regardless of the filter rate being obtained or the rate of build-up of cake on the precoat. Variation in the amount of slurry—of a given solid to liquid ratio—may permit operation of the filter at a lower than normal filter rate by build-up of cake; or, on the other hand, higher filter rates may be necessary to keep up with an increased volume of slurry available, which increased rate may be obtained by increasing the amount of precoat removed for each revolution of the filter drum. On the other hand, although the amount of liquid in the slurry may be fairly constant, maintaining a constant quality of the filtrate may require frequent changes in the solid-to-liquid ratio in the slurry. By thus changing the amount of solids to be removed, the filtrate capacity of the filter may require removal of precoat at a faster than normal rate. The conventional techniques for adjusting the movement of the knife, such as pressure differential or manual control have been found to be wasteful and uneconomic in the removal of precoat.

An object of this invention is a continuous filtration operation and apparatus therefor utilizing precoat on a rotary drum filter, which operation does not waste precoat material. Another object is an apparatus wherein a slurry of varying amount and/or varying quality is continuously and smoothly filtered in a continuous rotary drum type filter provided with a precoat. A particular object is an apparatus for removing clay from an oil-clay slurry in a manner that is economical of precoat by filtration through a continuous rotary drum filter provided with precoat. Other objects will become apparent in the course of the description.

The sole figure sets out an illustrative embodiment of the apparatus of this invention.

The apparatus of this invention comprises a vessel which receives the solid-liquid slurry from which the solids are to be removed by filtration. Conduit means are provided to introduce the slurry into the receiver vessel and to permit withdrawal of slurry from said vessel. An element which is responsive to the level of slurry is placed in the vessel. This element is connected to a controller which is responsive to the operation of the level-sensing element. A pump means provided with means for adjusting the rate of operation of the pump withdraws slurry from the vessel and passes it through a conduit to the tank of a continuous rotary drum filter. This conduit is provided with an adjustable valve means which is actuated by a second controller means that is responsive to the liquid level in the tank, which liquid level is determined by means responsive to said level. The rotary filter drum is positioned in a rotatable manner in said tank. A knife means is positioned in such a way that cake is removed from the rotating drum and passed to waste disposal. Drive means are provided which permit the movement of the knife means toward the surface of the rotary drum and thereby permit removal of precoat as well as cake during the filtering operation. In response to the operation of the liquid level sensing element in the vessel, the controller simultaneously actuates the operation of the pump and of the drive means.

The invention is described in one embodiment as set out in the annexed figure which forms a part of this specification. It is to be understood that this is one embodiment of the invention and does not limit the scope of the claims. In the figure, receiver vessel 11 is provided with inlet conduits 12 and 13 and slurry withdrawal conduit 14. Positioned within receiver vessel 11 is an element responsive to the level of slurry in vessel 11. This element is illustrated here as a float means 16. It is to be understood that any type of means which will permit determination of the height of slurry present in receiver vessel 11 may be utilized, for example, the float means illustrated; a thermo-electric bayonet means; a float resting on the liquid and guided in a vertical direction by a vertical rod or wire placed in the receiver; or radio-active type level detector and magnetic type detectors which permit following the level of the slurry without the need for an opening in the wall of vessel 11. Herein float means 16 is pivotably supported by the wall of receiver vessel 11 at the predetermined height of slurry which will cause the float means to actuate through line 17, control means 18 (designated "A" controller in the figure).

Instead of the single position responsive level means shown, the level element and the controller may be so constructed that continued change in height of the slurry in the vessel will provide a continuous impulse to the means responsive to controller 18.

The slurry is withdrawn from vessel 11 and conduit 14 by means of pump means 19. Herein pump means 19 is shown as a steam-driven reciprocating pump supplied with steam from source 21 by way of conduit 22, control valve 23 and conduit 24. The rate at which pump 19 operates and therefore the volume of slurry pumped may be suitably controlled by valve 23 or by valve 29; that is, means for controlling the operation of said pump means is provided. Valve means 23 is connected to controller 18 by line 26 and the rate of operation of pump 19 is therefore controlled by controller 18.

Conduit 28 permits the transfer of slurry from the discharge end of pump 19, through adjustable valve 29, into the slurry tank 31 of a continuous rotary drum filter. Controller 36 responds by way of line 37 to an element (shown herein as a float 38) that is responsive to the level of slurry in tank 31. By way of line 39, controller 36 adjusts the opening of valve 29. The control of valve 29 may be a simple off-on type operation or, preferably, the movement of the valve stem permits throttling operation and continuous flow of slurry at the desired rate through the conduit in order to maintain an essentially constant level of slurry in tank 31. A rotary drum filter 41 adapted for continuous operation is rotatably positioned in tank 31. This filter may be of the conventional type which is provided with vacuum means, cake wash means, etc., which are not shown herein. Filtrate (oil) is withdrawn from the filter by way of line 42.

The filter drum is provided with a precoat. The cake and precoat are removed from the drum by a knife means 44. The removed material is picked up by an apron 46 and discharged to a waste receiver 47. Drive means 48 are provided which permit the movement of the knife toward the surface of the drum, i. e., the cloth or wire mesh which supports the precoat. The drive means is adapted to movement at a constant predetermined rate or, preferably, is adapted to movement at any one of a number of rates. A Mercoid switch 51 is connected by way of line 52 to the drive means and by way of line 53 to controller 18. Thus controller 18 can simultaneously actuate both the drive means 48 and rate controlling valve 23 which controls the rate of operation of pump 19.

The operation of the apparatus of the invention is described in its use in the removal of adsorbent clay from a lubricating oil stock. The lubricating oil stock is to be treated with adsorbent clay, such as fuller's earth, or attapulgus clay to remove color bodies and also in some instances to remove acid sludge particles remaining in the oil after treatment with sulfuric acid. This lubricating oil stock varies in viscosity from the requirements for S. A. E. 5W to S. A. E. 50. In other words, the viscosity at 100° F., second Saybolt, varies from about 95 to about 1400; the corresponding viscosity at 210° F. varies from between about 38 to 100. The amount of clay present in the slurry varies with the type of stock being treated and whether or not the material has been treated with acid prior to claying. The amount of clay, in this case attapulgus clay having a size between about 60 mesh and 300 mesh, utilized is between about 0.02 and 0.80 pound per gallon of lubricating oil stock. The lubricating oil stock is charged to the filtering operation at a rate between about 2000 and 5000 barrels (42 gal.) per stream day. The actual rate of charge is determined by the operation of wax filters in a propane dewaxing operation preceding the clay treating operation. The rate of slurry charged to receiver 11 fluctuates not only with the type of lubricating oil stock, but also is unpredictable when treating a given stock. In some cases, the color of the filtrate may require immediate unpredictable changes in the ratio of clay to oil.

The oil-clay slurry is passed by way of conduit 12 into an upper portion of a stripping tower provided in receiver 11. This stripping tower is shown as containing partial horizontal baffles over which the slurry cascades downwards to the receiver proper. Small amounts of propane are present in the slurry and this material is removed from the slurry by steam which is introduced by way of conduit 13. The steam and propane are removed from vessel 11 by way of conduit 64.

The stripped slurry passes into the receiver proper and is withdrawn by way of conduits 14 and 28 by the use of pump 19. The filter utilized in the particular embodiment is manufactured by Oliver United Filters, Inc. and is a type BxE 12F1A filter adapted for use with precoat. This is a conventional precoat filter and needs no detailed description. In the apparatus as actually used, two or more filters are present in order to permit continuous operation. Prior to the introduction of slurry into tank 31, precoat material such as diatomaceous earth, charcoal, and paper pulp are laid down on the surface of the filter drum. In this particular embodiment the precoat was Johns-Manville Celite 503 which is a diatomaceous earth; the precoat was 2.5 inches thick at the start of the filtering operation.

In order to prevent overflow of slurry from tank 31, a liquid level responsive means (in this embodiment, a float) is positioned in tank 31 and is connected to controller 36. The amount of material being introduced into tank 31 is automatically adjusted by operation of controller 36 on adjustable valve 29 in response to signals from the float positioned in tank 31.

A knife or scraper is positioned across the face of drum 41 to remove the cake that is formed thereon after the removal of the oil filtrate. The knife 44 is connected to a drive means 48. The drive means in this embodiment consists of a constant speed motor, a variable ratio ratchet type speed reducer and a worm-gear train, which train is connected to the knife blade. The movement of the knife may be adjusted to any one of 12 different speeds which permit movement from 0.00013 inch per minute to 0.0016 inch per minute. Furthermore, switches are provided which permit either continuous cutting or discontinuous cutting with the periods of cessation of cutting controlled by a time switch. In this embodiment, a Mercoid switch 51 starts and stops the drive means 48 in response to impulses given by controller 18.

In this embodiment, a float means 16 is positioned in vessel 11 at a point such that a height equal to 35 volume percent of the receiver portion of vessel 11 will cause the float to actuate controller 18. Operation below this height is controlled by the filter rate which permits maintenance of a constant level in tank 31 while the knife 44 removes the cake without any forward movement, i. e., at a height below the predetermined point no precoat is removed by knife 44 and drive means 48 is in an "off" position. When the height in vessel 11 exceeds the predetermined point, float means 16 actuates controller 18 and in turn, controller 18 actuates the rate control valve 23 allowing more steam to pass to pump 19 and thereby increasing the rate of withdrawal of slurry from vessel 11; simultaneously controller 18 actuates switch 51, which in turn actuates drive means 48 and thereby causes the knife to move forward and remove precoat at a predetermined rate with a consequent increase in filter rate. As long as the addition of slurry to vessel 11 causes float means 16 to be above the predetermined height, drive means 48 continues to move the knife forward and cut precoat in order to obtain the necessary high filter rate. When the rate of introduction of slurry decreases and the height of slurry in vessel 11 drops below the predetermined point, float means 16 actuates controller 18 again and controller 18 turns off by way of switch 51 the drive means and decreases the flow of steam to a predetermined lower rate.

When these particular filters were placed into operation, they were provided with pressure differential controllers which were supposed to control the rate of travel of the knife in cutting the precoat. These pressure differential controllers were found to be completely ineffective and the knife traveled at a constant speed at whichever rate had been preselected. Under this method of operation, the life of the 2.5 inch precoat was about 7 days.

Elimination of pressure differential controls and substitution of a constant speed movement in conjunction with the timing switch such that movement of the knife was limited to about one-half the operating time did not improve the life of the precoat and further, permitted rather violent fluctuations in filter rates and upsets in the filtration operation with consequent disarrangement in the preceding operations.

A completely manual control of the rate of travel of the knife was substituted for the preceding methods and improvements in operation and precoat life were noted. However, at best the precoat life was less than two weeks.

The embodiment described in connection with the annexed figure was installed on this filtering operation wherein the rate of travel of the knife was controlled simultaneously with the speed of the pump by float means set at a predetermined level in vessel 11 and controller 18. Operation over a considerable period of time has shown that the life of the precoat is consistently about 6 weeks or on the order of 4 to 6 times as long as had been obtained by any previous method of controlling the operation of the filtration system.

Thus having described the invention, what is claimed is:

1. A filtration apparatus comprising a receiver vessel provided with conduits for the introduction and withdrawal of a slurry and an element responsive to the level of slurry in said vessel, a first controller means responsive to the operation of said element, pump means for withdrawing slurry from said vessel, means for controlling the operational rate of said pump means, a conduit provided with an adjustable valve means, connecting the discharge end of said pump means and the tank of a continuous rotary drum filter, a second element responsive to the level of slurry in said tank, a second controller means responsive to the operation of said second element, means actuated by said second controller means, for adjusting the opening of said valve means, a rotary drum filter, adapted for precoat operation, rotatably positioned in said tank, knife means positioned to remove cake continuously from said drum, drive means for controllably moving said knife means toward the surface of said drum and thereby removing precoat as said drum rotates, means whereby said pump control means and said drive means are simultaneously actuated by said first controller means in response to the slurry level in said vessel.

2. The apparatus of claim 1 wherein said element in said vessel is a float means.

3. The apparatus of claim 1 wherein said knife is moved forward at a predetermined constant rate.

References Cited in the file of this patent

UNITED STATES PATENTS

| | | |
|---|---|---|
| 2,270,938 | Doescher | Jan. 27, 1942 |
| 2,308,716 | ReQua | Jan. 19, 1943 |